(12) United States Patent
Lange et al.

(10) Patent No.: US 8,793,887 B2
(45) Date of Patent: Aug. 5, 2014

(54) METHOD AND APPARATUS FOR THREAD TESTING BY DISTANCE MEASUREMENT

(75) Inventors: Dirk Lange, Lüneburg (DE); Ulrich Mohr, Kassel (DE); Volker Redecker, Bispingen (DE)

(73) Assignee: Artis GmbH, Bispingen-Behringen (DE)

( * ) Notice: Subject to any disclaimer, the term of this patent is extended or adjusted under 35 U.S.C. 154(b) by 255 days.

(21) Appl. No.: 13/196,553

(22) Filed: Aug. 2, 2011

(65) Prior Publication Data
US 2012/0030956 A1 Feb. 9, 2012

(30) Foreign Application Priority Data
Aug. 3, 2010 (DE) .......................... 10 2010 038 830

(51) Int. Cl.
*G01B 5/14* (2006.01)

(52) U.S. Cl.
USPC .......................................... 33/199 R; 33/542

(58) Field of Classification Search
USPC .............................. 33/199 R, 199 B, 542, 629
See application file for complete search history.

(56) References Cited

U.S. PATENT DOCUMENTS

| | | | | |
|---|---|---|---|---|
| 4,202,109 | A * | 5/1980 | Schasteen | 33/199 R |
| 4,219,938 | A * | 9/1980 | Tommeraas et al. | 33/199 R |
| 4,335,518 | A * | 6/1982 | Reef | 33/199 R |
| 4,761,891 | A * | 8/1988 | Sugimura | 33/503 |
| 4,926,700 | A * | 5/1990 | Peplinski | 73/862.23 |
| 5,170,306 | A * | 12/1992 | Gomes | 33/199 R |
| 5,251,154 | A * | 10/1993 | Matsumoto et al. | 33/199 R |
| 6,289,595 | B1 * | 9/2001 | Galestien | 33/199 R |
| 7,059,055 | B2 * | 6/2006 | Wickham et al. | 33/199 R |
| 7,533,471 | B2 * | 5/2009 | Lange et al. | 33/199 R |
| 7,661,196 | B1 * | 2/2010 | Kipnes | 33/199 R |
| 7,941,932 | B2 * | 5/2011 | Kipnes | 33/199 R |
| 2002/0083613 | A1 * | 7/2002 | Wells, Jr. | 33/784 |
| 2003/0101602 | A1 * | 6/2003 | Galestien | 33/199 R |
| 2006/0005405 | A1 * | 1/2006 | Wickham et al. | 33/199 R |
| 2008/0028623 | A1 * | 2/2008 | Lange et al. | 33/199 R |
| 2010/0018066 | A1 * | 1/2010 | Kipnes | 33/199 R |
| 2010/0186242 | A1 * | 7/2010 | Kipnes | 33/199 R |
| 2012/0030956 | A1 * | 2/2012 | Lange et al. | 33/199 R |
| 2013/0118018 | A1 * | 5/2013 | Mehler | 33/199 R |

FOREIGN PATENT DOCUMENTS

| | | |
|---|---|---|
| DE | 3534115 | 4/1987 |
| DE | 4017376 | 12/1991 |
| DE | 9316783 U1 | 1/1994 |
| DE | 202004011683 | 9/2004 |
| DE | 102007028615 | 1/2008 |
| EP | 0459262 A2 | 12/1991 |
| EP | 0675337 A2 | 10/1995 |
| WO | 0167032 A1 | 9/2001 |

OTHER PUBLICATIONS

Supplemental European Search Report for corresponding European Application No. 11176462.7-2213 mailed Feb. 15, 2012.

\* cited by examiner

*Primary Examiner* — Yaritza Guadalupe-McCall
(74) *Attorney, Agent, or Firm* — Renner, Otto, Boisselle & Sklar LLP

(57) ABSTRACT

Apparatus for thread testing, comprising at least one plug gauge (6) for testing a thread (8), the plug gauge being adapted for connecting with a machine axis (2) of a machine tool (1) and a displacement sensor (12) connectable with the at least one plug gauge (6) and the machine axis (2) for determining a maximum path (23) which the plug gauge (6) may be screwed into thread (8).

20 Claims, 6 Drawing Sheets

A-A (1:1)

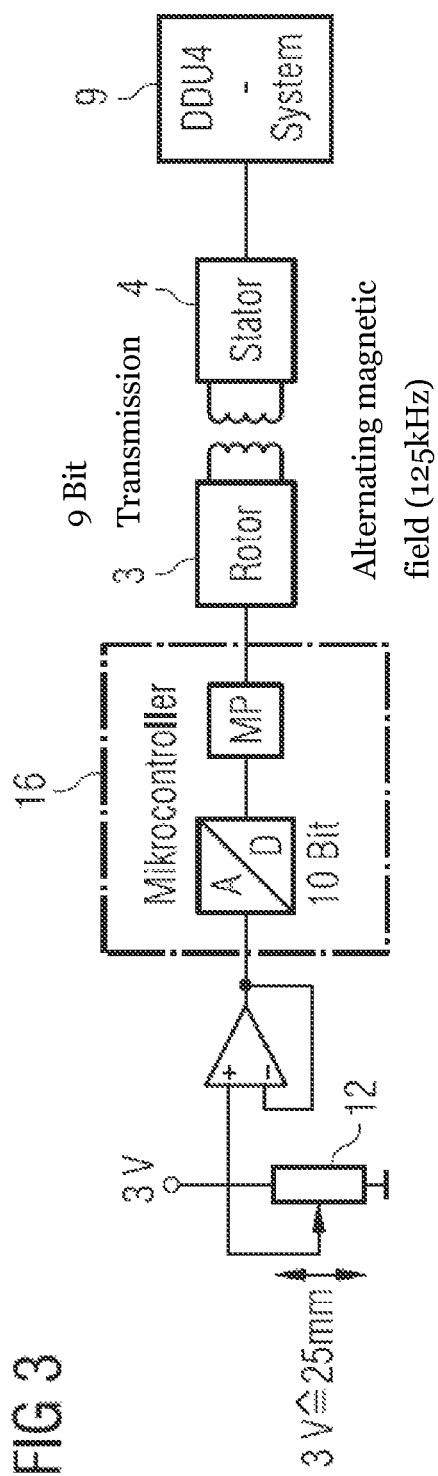

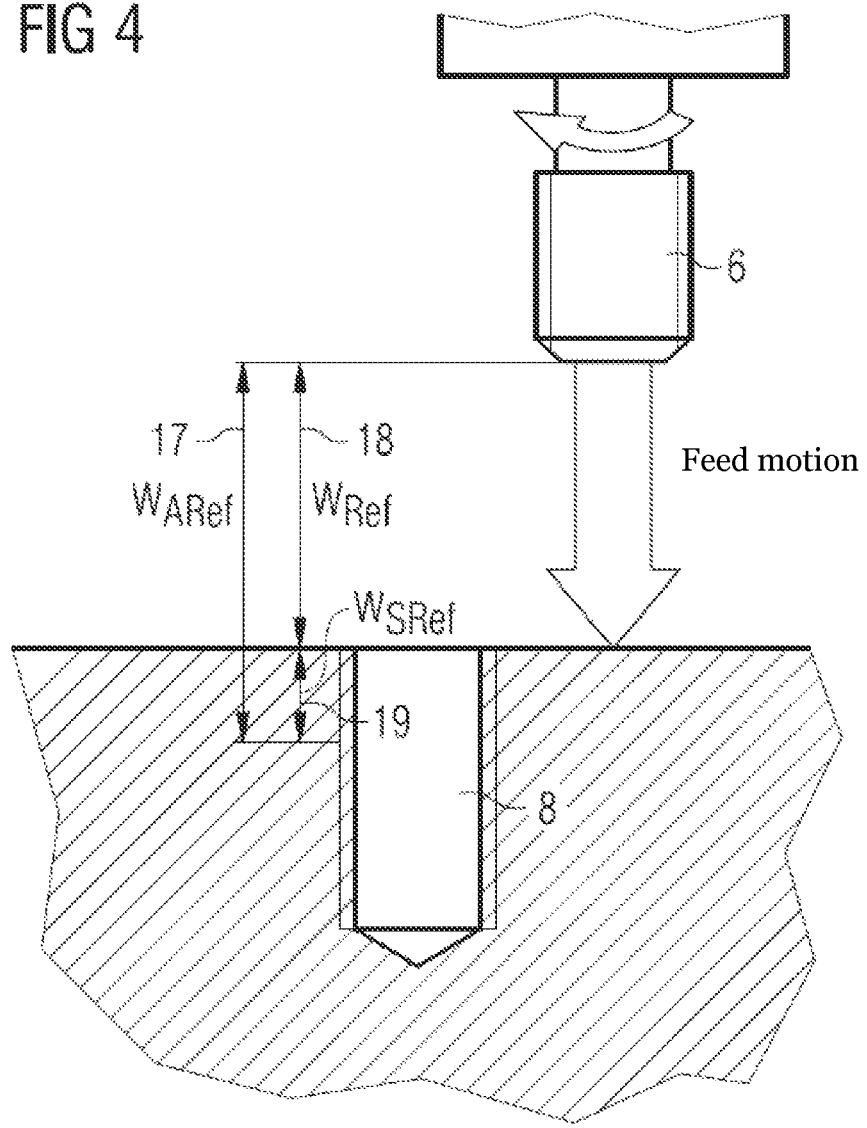

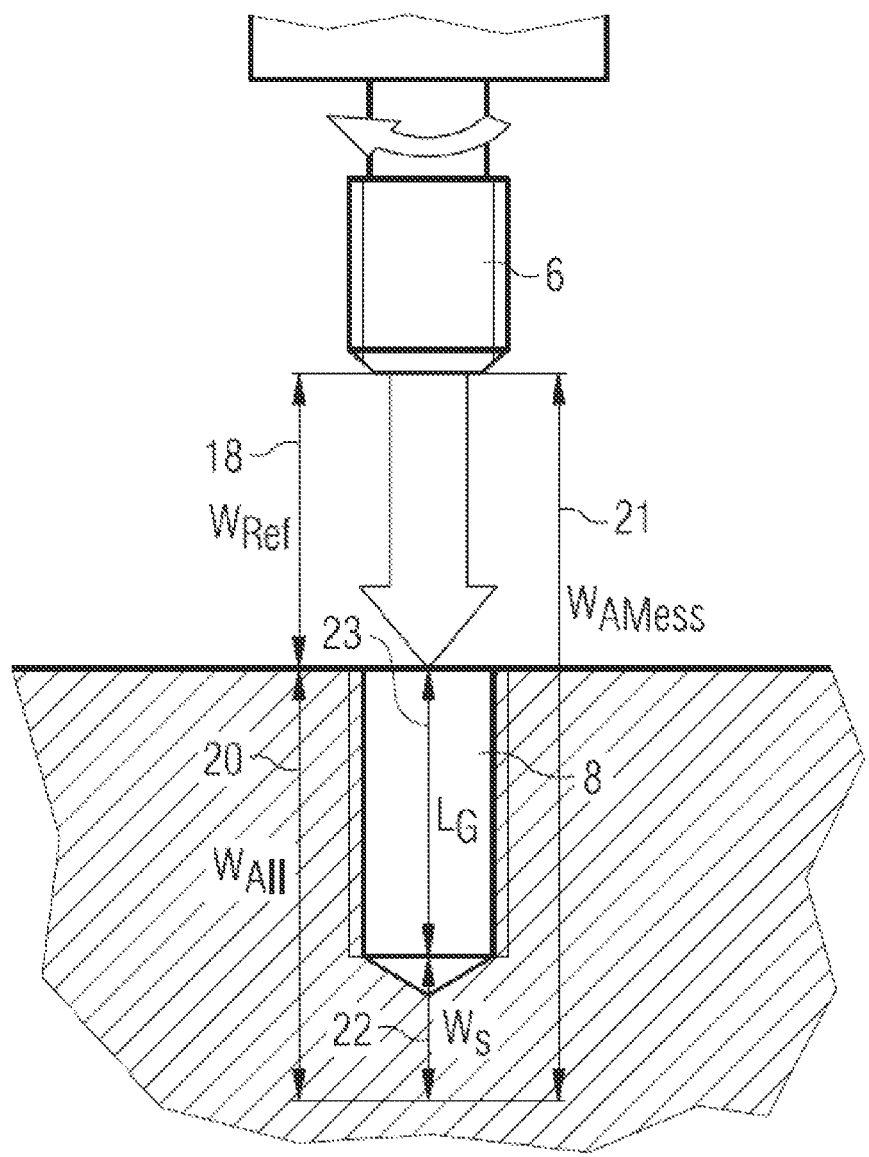

Figure 1:
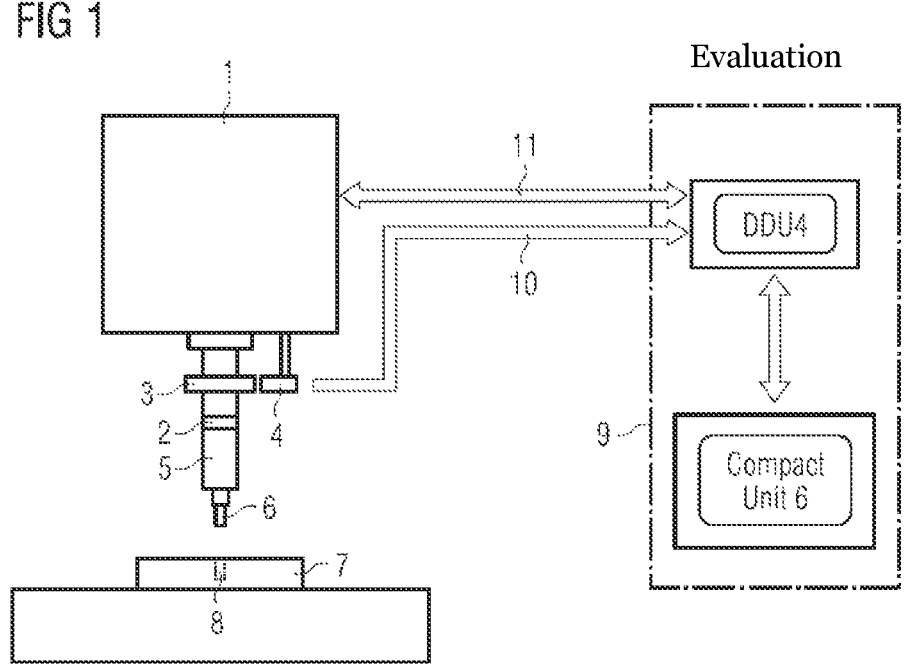

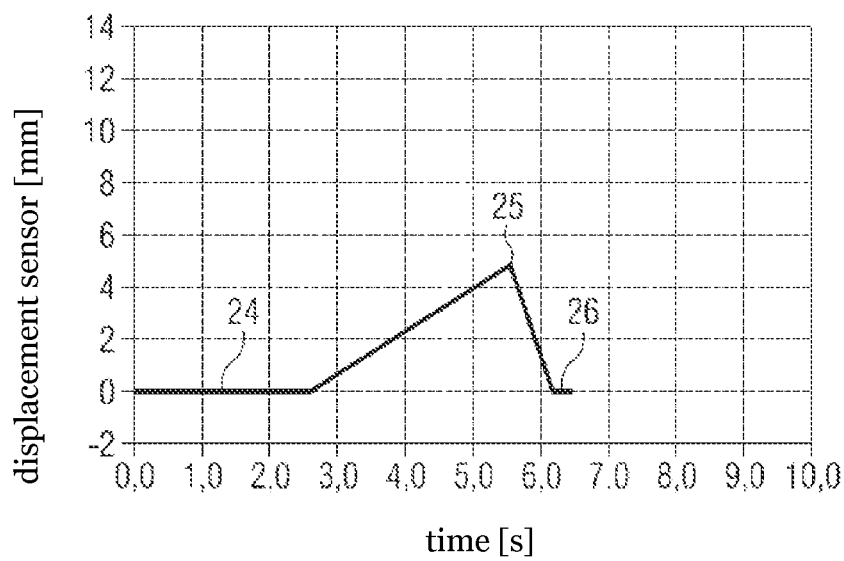
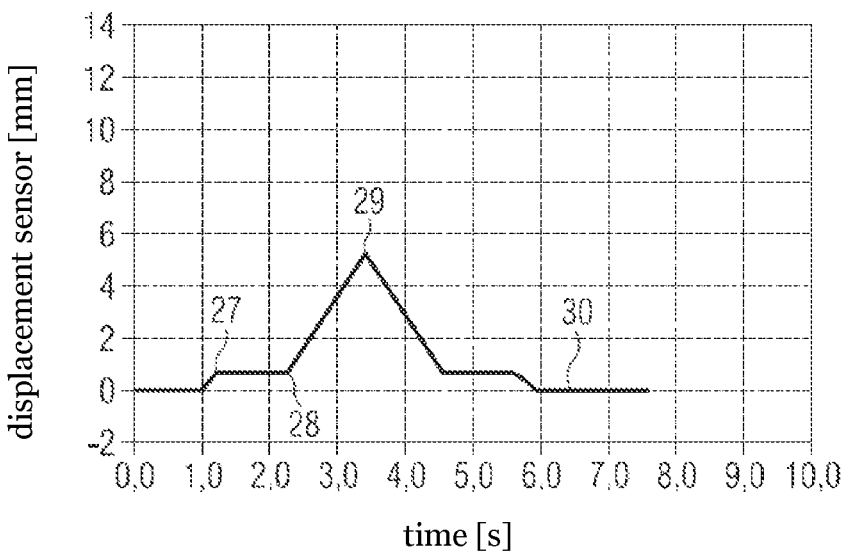

METHOD AND APPARATUS FOR THREAD TESTING BY DISTANCE MEASUREMENT

1. TECHNICAL FIELD

The present invention relates to an apparatus for thread testing in a machine tool and to related methods.

2. TECHNICAL BACKGROUND

Nowadays high demands are made on the cost effectiveness and the productivity of industrial facilities. On the other hand, there are high demands on the quality of produced work pieces. These contradicting objectives usually can only be achieved with a large degree of automation. Further, several methods for manufacturing are integrated within a single machine tool, in order to reduce the number of cycles and labor. One example is the integration of processes for cutting and grinding in a single processing period.

Known systems for automated thread testing are integrated in an assembly line or provided as independent testing facility. To this end, additional stations or cells for testing are usually integrated in the assembly line to allow for automated testing. Alternatively, manual testing devices may be used for a manual testing of threads.

When measuring the quality using separate measuring cells the work piece has to be discharged from the machine tool and may then automatically be inserted into the measuring cell or random samples of the part are inserted manually into the measuring cell. This requires large investments for additional measuring cells and usually implies a delayed testing. This could lead to a delayed discovery of quality defects and thus to an increased number of defectives. In some approaches the diameter and geometries are measured using inductive sensing elements directly in the machine. In the field of thread testing, however, the testing is carried out afterwards and either automatically or manually.

In general, the quality of internal threads is carried out according to DIN 13 Part 18 as follows: Screwing in the "GO plug gauge" into the full length of the thread by hand should be possible without exerting particular force. If this is not possible, the thread does not meet the requirements. Screwing in the "NO GO plug gauge" more than two revolutions by hand must be impossible from both ends of the thread. If it is possible to carry out more than two revolutions without exerting particular force the thread does not meet the requirements.

The German patent application DE 40 17 376 A relates to means for thread testing, in particular for internal threads.

The German patent application DE 35 34 115 A relates to a self-acting device for assembly and/or testing comprising a measuring support which is attached to an arbor. The displacement of the arbor can be measured using a displacement sensor.

The German patent application DE 43 24 109 A relates to an apparatus for thread testing. It includes a light barrier for sensing the screw in depth of a plug gauge.

The German patent DE 16 23 212 relates to an apparatus for thread testing. The screw in depth can be determined by measuring a relative movement between arbor and guidance using trip cams.

The publication of the German patent application DE 10 2006 034 823 A1 relates to an apparatus and a method for thread testing, wherein a plug gauge is screwed into the thread. Thereby, signals that relate to the screwing in of the plug gauge may be measured and analyzed. These signals may for instance relate to the physical quantities current, active power, torque and/or distance.

However, by screwing in it is only possible to determine whether the diameter of the thread and the thread as such comply with the requirements. This is not sufficient for many processes and additional characteristic quantities are required for a reliable quality inspection. For instance, for safety-relevant parts it is important that the thread is not only tapped correctly, but also that the corresponding screw fits optimal into the thread, in order to yield the best hold.

The technical problem underlying the present invention is therefore to provide an apparatus and corresponding methods for simple and cost-efficient thread testing, wherein more reliable and additional parameters may be measured than in prior art for determining the quality of a thread.

3. SUMMARY OF THE INVENTION

This problem is solved according to a first embodiment of the present invention by an apparatus for thread testing that comprises at least one plug gauge being adapted for connecting to a machine axis of a machine tool and a displacement sensor connectable with the plug gauge and the machine axis for determining a maximum path which the plug gauge may be screwed into the thread.

Therefore, it is possible to determine the quality of the thread and the depth of the thread in a single step. Thereby, the huge effort for positioning the plug gauge can be clearly reduced. According to the prior art, these steps are carried out one after another, i.e., the thread is tested in a first step and the depth of the thread is tested in a subsequent second step. By simultaneous measurement, the quality of a part may be tested much easier and more efficient.

This novel apparatus for thread testing allows for a complete and process-oriented testing of a thread in the same machine tool where it has been produced before, for instance by attaching the apparatus to a special tool holder on the machine tool. There is no special machine tool for thread testing required.

In particular, the displacement sensor is adapted for detecting a relative movement between the plug gauge and the machine axis after the plug gauge has been screwed in. Thereby, the traversed distance and thus the depth of thread may be easily determined. It is further possible to measure the total traversed distance, e.g., by attaching the displacement sensor in a different way.

Preferably, the relative movement detected by the displacement sensor is coaxial or parallel to the plug gauge. In this way, the traversed distance can be measured directly. Thus, the linearity of the shift allows for an easy measurement.

It is preferred that the displacement sensor comprises a potentiometric displacement transducer. Thereby, by measuring a variable resistance which results from the relative movement, a changed voltage can be determined very precisely which allows for an exact measurement of the traversed distance. However, other embodiments are conceivable, e.g., a path measurement may also be carried out using optical signals.

In a preferred embodiment, the apparatus is placed in a measuring support that is suited for mounting into the tool magazine of the machine tool. This embodiment, in particular the use of standardized tool interfaces (e.g., HSK, Capto, DIN) permit the simple use of the measuring support in the tool magazine of the machine tool. Moreover, this apparatus is suited for use in basic machine tools, which are no longer needed for assembly. Another advantage of this embodiment are cost-savings when compared to special machine tools.

Preferably, the apparatus is suitable for measuring and storing a reference value before the first thread testing. The automatic calibration supersedes a slower and often more imprecise manual calibration. Moreover, this kind of calibration is more ergonomic in view of the manual calibration.

It is preferred that the reference value is determined by the distance between the end of the plug gauge that faces the thread in a starting position and the opening of the thread facing the plug gauge. This advantageous configuration allows using plug gauges of different lengths. Furthermore, this approach is independent of inaccuracies that may occur when mounting the plug gauge. However, in general, other approaches for determining the reference value are also possible.

Preferably, the apparatus also comprises an evaluation unit to which the measured values may be transmitted wirelessly. The automated measurement allows for transmitting a large selection of measured values to the evaluation unit which monitors the measurement. This is not only more ergonomic but also faster and more precise than a manual measurement.

In a preferred embodiment, the evaluation unit can detect a flawed thread by comparing at least one measured value to at least one nominal value. The simple adjustment of nominal values allows the direct comparison with tolerance values. In this way, it is not only possible to change the parameters of a thread to be tested, but also to adjust the tolerance values, e.g., a smaller tolerance for threads that have to be manufactured very precisely and a coarser tolerance for threads which may be less precisely manufactured.

In another preferred embodiment, the nominal value relates to the profile and/or length of the thread. By comparing the nominal value for the length of the thread to a measured value, it is possible to determine the quality of a thread beyond the usual parameters (e.g., diameter of the thread).

In one aspect of the invention, the problem underlying the invention is also solved by a method for thread testing, comprising the step of testing the thread and its length employing a plug gauge by using any of the above explained apparatuses.

4. SHORT DESCRIPTION OF THE DRAWINGS

Figure 2:
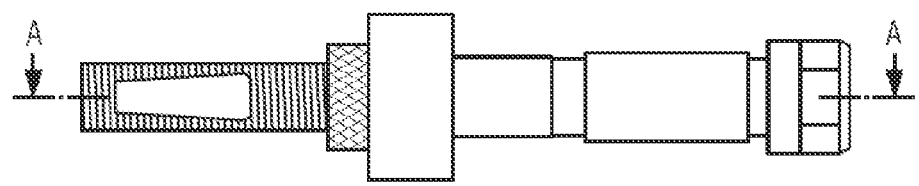
Figure 2:
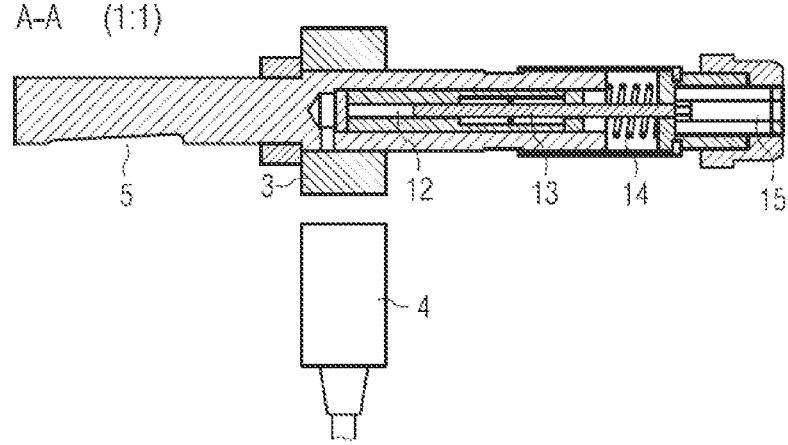

In the following, certain embodiments of the present invention will be explained with reference to the accompanying figures. The figures show:

FIG. 1: a system for automated thread testing according to one embodiment of the present invention;

FIG. 2: a measuring support and a stator according to one embodiment of the present invention;

FIG. 3: a block diagram of the electronics of the rotor and the evaluation unit according to one embodiment of the present invention;

FIG. 4: a reference measurement for calibrating of an apparatus according to one embodiment of the present invention;

FIG. 5: a measurement of the thread depth according to one embodiment of the present invention;

FIG. 6: an example of a signal of a reference measurement for calibrating the system for thread testing; and FIG. 7: an example of a signal for thread testing.

5. DETAILED DESCRIPTION

In the following, presently preferred embodiments of the apparatus and method for thread testing by path measurement according to the present invention are described in more detail.

FIG. 1 shows a representation of the complete system according to one embodiment of the present invention. Machine tool 1 and work piece 7 comprising the thread 8 for testing can be seen. A plug gauge 6 is placed in the measuring support 5 which is attached to machine tool 1. The energy supply of rotor 3 as well as data transmission is achieved by an alternating magnetic field between rotor 3 and stator 4. Thus, the signals are transmitted contactless between rotor 3 and stator 4 and may then be transferred 10 wireless or by wire to evaluation unit 9. Further, there exists a wireless or wired connection 11 between machine tool 1 and evaluation unit 9. Over this connection, parameters such as feed can be set. Evaluation unit 9 may comprise a display unit which may be suited for visualization, operation and/or storage of data (e.g., evaluation unit of type DDU4 and display unit of type Compact Unit 6 of applicant). At startup, machine tool 1 sends a starting signal to evaluation unit 9.

FIG. 2 illustrates a detailed representation of measuring support 5 and stator 4. Rotor 5 is located at measuring support 5. The lower part of FIG. 2 shows a sectional drawing along the longitudinal axis of measuring support 5. Herein a potentiometric displacement transducer 12 is located which is suitable for measuring a relative movement between the plug gauge (reference sign 6 in FIG. 1) that is mounted to the collet chuck 15 and the measuring support 5. The pressure exerted by the plug gauge is transmitted via compression spring 14 and connecting rod 13 to potentiometric displacement transducer 12. Thereby, potentiometric displacement transducer 12 is moved and a signal corresponding to a distance may be measured. Further, measuring support 5 comprises a torque-dependent sliding clutch (not shown). If plug gauge 6 encounters a too small thread 8 (or no thread at all) when machine tool 1 is performing a feed motion, the pressure compensation prevents by software means damage of work piece 7 and of plug gauge 6 since an alarm is triggered if a defined distance is exceeded. The sliding clutch, which slides when an applied torque is too large, also prevents damage to plug gauge 6 and work piece 7, e.g., if thread 8 is too small. Plug gauge 6 is always adapted to the respective thread size of the preceding thread processing.

If the NC-program is started for testing, evaluation module 9 receives a starting signal. In the following, the distance signals and torque signals of measuring support 5 are measured and evaluated. The feed force is measured by strain gauges (here not shown). If the measurements do not coincide with the previously set parameters (e.g., diameter of thread 8), it is supposed that thread 8 is not in good order. The generated alarm is then transmitted to machine tool 1 and leads to discharging of the work piece 7 or manual testing of the thread. In this way, it is possible to quickly discover faulty threads 8 and thus avoid rejects.

FIG. 3 is a block diagram of the rotor electronics. The signal is recorded in measuring support 5 using the potentiometric displacement transducer 12, wherein according to a preferred embodiment a distance of 25 mm corresponds to a voltage variation of 3V. Using an impedance converter, the signal is transferred to microcontroller 16 which is also comprised in measuring support 5. Therein, the signal is digitalized using an analog-to-digital converter (ADC). The energy supply of rotor 3 and data transmission are realized by means of an alternating magnetic field between rotor 3 and stator 4. To this end, a coil has been integrated into rotor 3 as well as stator 4. The alternating field is created by stator 4 and has a frequency of 125 kHz. Using this transmission method, a repetition rate of 10 ms is stipulated for a path measurement and a torque measurement, respectively. Thus, only limited bandwidth is available. Therefore, the signal resolution has to be reduced. Rotor 3 gains its whole energy supply from the alternating magnetic field and therefore represents in the system a passive transponder. By the induction caused by the coil of rotor 3 and an additional shunt resistor the magnetic field can be specifically loaded and unloaded. As mentioned, the energy is preferably supplied using stator 4 which transmits energy and signals inductively. The information is transmitted from measuring support 5 to stator 4 also via the inductive distance.

In another preferred embodiment, only the energy supply is achieved by stator 4, which transmits the energy inductively. The information exchange is done via radio. In a further preferred embodiment, the energy supply is achieved by using an integrated accumulator (not shown in the figures), which may be loaded either inductively or via contact pins. Therein, one pin may be the ground potential of the measuring support or the machine tool and the other pin is either a jack or a contact ring.

FIG. 4 is a representation of a reference measurement 18, which has to be carried out after each new application of the measuring support 5 and exchange of plug gauge 6. With reference measurement 18, the distance between the cone point of plug gauge 6 and the surface of the work piece is determined. This may be achieved using an additional displacement sensor or by using path information stored in the NC-machine. In a preferred embodiment, the maximum distance of the displacement sensor is 20 mm. In order to avoid a collision or an overload between plug gauge 6 and work piece 7, an alarm is generated and transmitted from evaluation unit 9 to machine tool 1, if the elongation exceeds 18 mm. If the torque is too big, e.g., if thread 8 is too small, sliding clutch of measuring support 5 starts sliding. In this way, damages may be avoided. For calibration, the distance of the machine axis 2 $W_{ARef}$ 19 is entered manually. It is to be noted that for the above mentioned reasons the feed distance of the machine to the expected final position has to be adjusted such that the displacement sensor experiences a displacement through the surface of the work piece. However, this displacement must not be larger than 18 mm. The determination of this distance may be realized via an additional displacement sensor which may also be part of the system. Measuring support 5, which preferably comprises a quick change chuck, displacement sensor 12, the sliding clutch and plug gauge 6 is now set into rotation and thereby moved onto the work piece 7 such that plug gauge 6 hits the surface of the work piece and displacement sensor experiences a displacement. The displacement $W_{SRef}$ 19 is derived from the maximum occurring pressure compensation and thus consequently from the displacement of the potentiometer pickoff in displacement sensor 12. From that, reference distance $W_{Ref}$ 18 may be determined according to the following formula: $W_{Ref}=W_{ARef}-W_{SRef}$.

FIG. 5 shows a representation of the actual measurement, in particular of the measurement of the thread depth 23. As for the reference measurement 18, the distance $W_{AMess}$ 21 which the machine axis 2 traverses has to be adjusted to a minimum length so that displacement sensor 12 experiences an elongation due to the expected thread depth or the set value, respectively. However, the distance must again not exceed 18 mm. Now, measuring support 5 with plug gauge 6 is set into rotation, as for the reference measurement 18, and moved onto the work piece 7, such that plug gauge 6 penetrates the thread bore 8. In order to derive the thread depth $L_G$ 23, at first the distance $W_{AN}$ 20 which corresponds to the distance traversed by the machine axis 2 from the zero point is needed. The zero point is located on the surface of the work piece. $W_{AN}$ 20 follows from the distance $W_{AMess}$ 21 which the machine axis 2 traverses during the measurement and the previously determined reference distance $W_{Ref}$ 18 as follows: $W_{AN}=W_{AMess}-W_{Ref}$. In order to determine the thread depth $L_G$ 23, the distance $W_S$ 22 determined by displacement transducer 12 is subtracted from the distance $W_{AN}$ 20 traversed by machine axis 2 from the zero point. As explained for the reference measurement, the distance $W_S$ 22 follows analogous to $W_{SRef}$ 19 from the maximum axial pressure compensation and the displacement of the potentiometer pickoff in displacement transducer 12. Therefore, the thread depth $L_G$ 23 is determined as follows: $L_G=W_{AN}-W_S$. The accuracy of the thread depth measurement depends on the accuracy of the machine or the external distance measurement system. The overall resolution is usually better than 0.1 mm.

FIGS. 6 and 7 represent an exemplary and typical propagation of the position of the sensor. In FIG. 6 the propagation 19 of the sensor for a reference measurement is shown. A characterizing feature of the propagation is the linear rise and drop of the sensor propagation. The slope of the respective sections depends on the velocity of the machine axis of machine tool 1. During the reference measurement 17 the lower end of the plug gauge 6 directly hits the surface of the work piece and displacement transducer 12 experiences a lift, starting at reference sign 24. If the feed axis has reached its final position (in FIG. 6 this corresponds to the peak of graph 25) it moves back to its initial position, which results in a drop of the signal until the displacement sensor has returned to its starting position 26.

During the measurement of FIG. 7, the plug gauge 6 penetrates 27 the thread after approximately 1 s and reaches the bottom 28 of the thread bore after approximately 2.2 s. Then displacement sensor 12 experiences a lift. At the maximum distance of the sensor (in FIG. 7 the peak of graph 29) the feed axis has reached its final position and moves in reverse order back to its initial position 30 after the plug gauge 6 has been unscrewed from the thread.

In the evaluation, the determined thread depth 23 is then compared with selected parameters. If these values do not correspond, an alarm is generated and transmitted to the machine tool 1. For instance, if the sensor traverses a maximum distance, the measuring system could recognize a thread 8 which is too small and generate an alarm. In another example, if no change of the distance signal (in displacement sensor 12) is measured, a thread which is too long may be detected and an alarm may be generated. Further, all measured data may be stored, preferably in a standardized format, so that they may be processed by known software for measuring or statistics (e.g., QDAS or Measurelink).

List of Reference Signs
1 machine tool
2 machine axis
3 rotor
4 stator
5 measuring support
6 plug gauge
7 work piece
8 thread
9 evaluation unit
10 data transmission between stator and evaluation unit
11 data transmission between machine tool and evaluation unit
12 displacement sensor
13 connecting rod
14 compression spring
15 collet chuck
16 micro controller
17 $W_{ARef}$ distance of machine axis
18 $W_{Ref}$ reference measurement
19 $W_{SRef}$ distance of sensor (reference measurement)
20 $W_{AN}$ distance of machine axis from zero point 21 $W_{AMess}$ full distance that the machine axis traverses during measurement
22 $W_S$ distance of sensor (measurement)
23 $L_G$ thread depth
24 lift of displacement sensor during reference measurement
25 end of movement of displacement sensor (reference measurement)
26 initial position (reference measurement)
27 penetration of plug gauge into thread
28 plug gauge reaches bottom of thread
29 end of movement of displacement sensor (measurement)
30 initial position (measurement)

This application claims priority of German Patent Application No. 102010038830.0 filed on Aug. 3, 2010, which is hereby incorporated herein by reference.

What is claimed is:

1. An apparatus for thread testing, comprising:
   a. at least one plug gauge for testing a thread, the plug gauge being configured for connecting with a machine axis of a machine tool;
   b. a displacement sensor connectable with the at least one plug gauge and the machine axis for determining a maximum path which the plug gauge may be screwed into thread.

2. An apparatus according to claim 1, wherein the displacement sensor is configured for detecting a relative movement between the plug gauge and the machine axis after the plug gauge has been screwed in.

3. An apparatus according to claim 2, wherein the relative movement detected by the displacement sensor is parallel or coaxial to the plug gauge.

4. An apparatus according to claim 1, wherein the displacement sensor comprises a potentiometric displacement transducer.

5. An apparatus according to claim 1, wherein the apparatus is placed in a measuring support that is suited for mounting into a tool magazine of the machine tool.

6. An apparatus according to claim 1, further being configured for measuring and storing a reference value before the first thread testing.

7. An apparatus according to claim 6, wherein the reference value is determined by the distance between the end of the plug gauge that faces the thread in a starting position and the opening of the thread facing the plug gauge.

8. An apparatus according to claim 1, further comprising an evaluation unit to which the measured values may be transmitted wirelessly.

9. An apparatus according to claim 8, wherein the evaluation unit detects a flawed thread by comparing at least one measured value to at least one nominal value.

10. An apparatus according to claim 9, wherein the at least one nominal value relates to the profile and/or length of thread.

11. A method for thread testing, comprising the step of testing the thread and the thread depth using a plug gauge and a displacement sensor according to claim 1.

12. A method for thread testing, comprising the step of testing the thread and the thread depth using the apparatus according to claim 2.

13. A method for thread testing, comprising the step of testing the thread and the thread depth using the apparatus according to claim 3.

14. A method for thread testing, comprising the step of testing the thread and the thread depth using the apparatus according to claim 4.

15. A method for thread testing, comprising the step of testing the thread and the thread depth using the apparatus according to claim 5.

16. A method for thread testing, comprising the step of testing the thread and the thread depth using the apparatus according to claim 6.

17. A method for thread testing, comprising the step of testing the thread and the thread depth using the apparatus according to claim 7.

18. A method for thread testing, comprising the step of testing the thread and the thread depth using the apparatus according to claim 8.

19. A method for thread testing, comprising the step of testing the thread and the thread depth using the apparatus according to claim 9.

20. A method for thread testing, comprising the step of testing the thread and the thread depth using the apparatus according to claim 10.

* * * * *